US011668405B2

(12) United States Patent
Nikles

(10) Patent No.: US 11,668,405 B2
(45) Date of Patent: Jun. 6, 2023

(54) FLUID DISPENSING DEVICE WITH SAFETY VALVE

(71) Applicant: NIKLES INTER AG, Aesch (CH)

(72) Inventor: Gerhard Nikles, Aesch (CH)

(73) Assignee: NIKLES INTER AG, Aesch (CH)

( * ) Notice: Subject to any disclaimer, the term of this patent is extended or adjusted under 35 U.S.C. 154(b) by 0 days.

(21) Appl. No.: 17/394,139

(22) Filed: Aug. 4, 2021

(65) Prior Publication Data

US 2022/0042612 A1   Feb. 10, 2022

(30) Foreign Application Priority Data

Aug. 5, 2020   (IT) .................. 102020000019291

(51) Int. Cl.
*F16K 17/04* (2006.01)
*F16K 15/06* (2006.01)
*F16K 27/02* (2006.01)

(52) U.S. Cl.
CPC ............ *F16K 17/04* (2013.01); *F16K 15/063* (2013.01); *F16K 27/0209* (2013.01); *F16K 2200/30* (2021.08)

(58) Field of Classification Search
CPC ............... F16K 15/063; F16K 27/0209; F16K 2200/30; F16K 17/04
See application file for complete search history.

(56) References Cited

U.S. PATENT DOCUMENTS

| 4,862,913 A | 9/1989 | Wildfang |
| 2004/0118458 A1* | 6/2004 | Jungmann ............ B01D 35/147 137/543 |
| 2017/0370489 A1* | 12/2017 | Zuercher ................. F16K 17/04 |
| 2018/0112380 A1 | 4/2018 | Hauth |

FOREIGN PATENT DOCUMENTS

| CN | 102671791 B | 12/2014 |
| CN | 104971834 A | 10/2015 |
| EP | 0 190 965 A1 | 8/1986 |

OTHER PUBLICATIONS

Italian Search Report for Italian Patent Application No. 102020000019291 dated Apr. 1, 2021, 2 pages.

* cited by examiner

*Primary Examiner* — P. Macade Nichols
(74) *Attorney, Agent, or Firm* — Merchant & Gould P.C.

(57) ABSTRACT

A safety valve is for controlling dispensing of a fluid flow from a conduit. A valve body forms an inlet opening of the fluid, an outlet opening of the fluid, and a main passageway for the fluid which fluidly connects the inlet opening to the outlet opening. At least one fluid relief opening fluidly communicates with the outlet opening through a valve seat. A shutter elastically cooperates with the valve seat to be biased by an elastic device to sealingly close the valve seat, and to open said seat when the pressure of the fluid in the outlet opening exceeds the force applied by said elastic device.

8 Claims, 6 Drawing Sheets

FLUID DISPENSING DEVICE WITH SAFETY VALVE

This application claims benefit of Ser. No. 10/202, 0000019291, filed 5 Aug. 2020 in Italy, and which application is incorporated herein by reference. To the extent appropriate, a claim of priority is made to the above-disclosed application.

FIELD OF THE INVENTION

The present invention relates to a safety valve for controlling the dispensing of a fluid flow from a conduit, in particular a water flow dispensed from a sanitary apparatus, e.g. a tap. Moreover, the object of the invention is a device for dispensing a liquid flow, e.g. water, comprising the safety valve.

The present invention mainly, but not exclusively, applies to the field of tap fittings, in which it is known to connect an accessory, usually identified with the term "aerator" to the water outlet opening, which aerator mixes the water with air, making it flow in a more uniform and smoother manner, and which can also perform a function of filter.

BACKGROUND OF THE INVENTION

It has been seen how in certain cases, for example in the presence of particularly calcareous water, the aerator can be completely obstructed in the long run, so as to increase the pressure of the water unexpectedly and dangerously in the dispensing device. An excessive overpressure can also result in the breaking of the dispensing device or of the water supply pipes.

SCOPE OF THE INVENTION

It is the object of the present invention to propose a safety valve and a dispensing device capable of obviating the above-described drawbacks.

Such an object is achieved by a safety valve for controlling the dispensing of a fluid flow from a duct, comprising:
  a valve body which forms an inlet opening of the fluid, an outlet opening of the fluid, a main passageway for the fluid which fluidly connects the inlet opening to the outlet opening, at least one fluid relief opening which fluidly communicates with the outlet opening through a valve seat;
  a shutter elastically cooperating with the valve seat so as to be normally biased by an elastic device to sealingly close the valve seat and open said seat when the pressure of the fluid in the outlet opening exceeds the force applied by said elastic device.

Moreover, such an object is achieved by a liquid dispensing device, comprising:—a safety valve comprising:
  A) a valve body which forms an inlet opening of the fluid, an outlet opening of the fluid, a main passageway for the fluid which fluidly connects the inlet opening to the outlet opening, at least one fluid relief opening which fluidly communicates with the outlet opening through a valve seat;
  B) a shutter elastically cooperating with the valve seat so as to be normally biased by an elastic device to sealingly close the valve seat and open said seat when the pressure of the fluid in the outlet opening exceeds the force applied by said elastic device;
  an aerator connected to the outlet opening of the safety valve.

BRIEF DESCRIPTION OF THE DRAWINGS

Further features and advantages of the safety valve and the dispensing device according to the invention will in any case be apparent from the following description of preferred embodiments thereof, given only by way of non-limiting, indicative example, with reference to the accompanying drawings, in which.

DESCRIPTION OF PREFERRED EMBODIMENTS

A safety valve for controlling the dispensing of a fluid according to the invention is indicated as a whole in said drawings by numeral 1.

Figure 6:
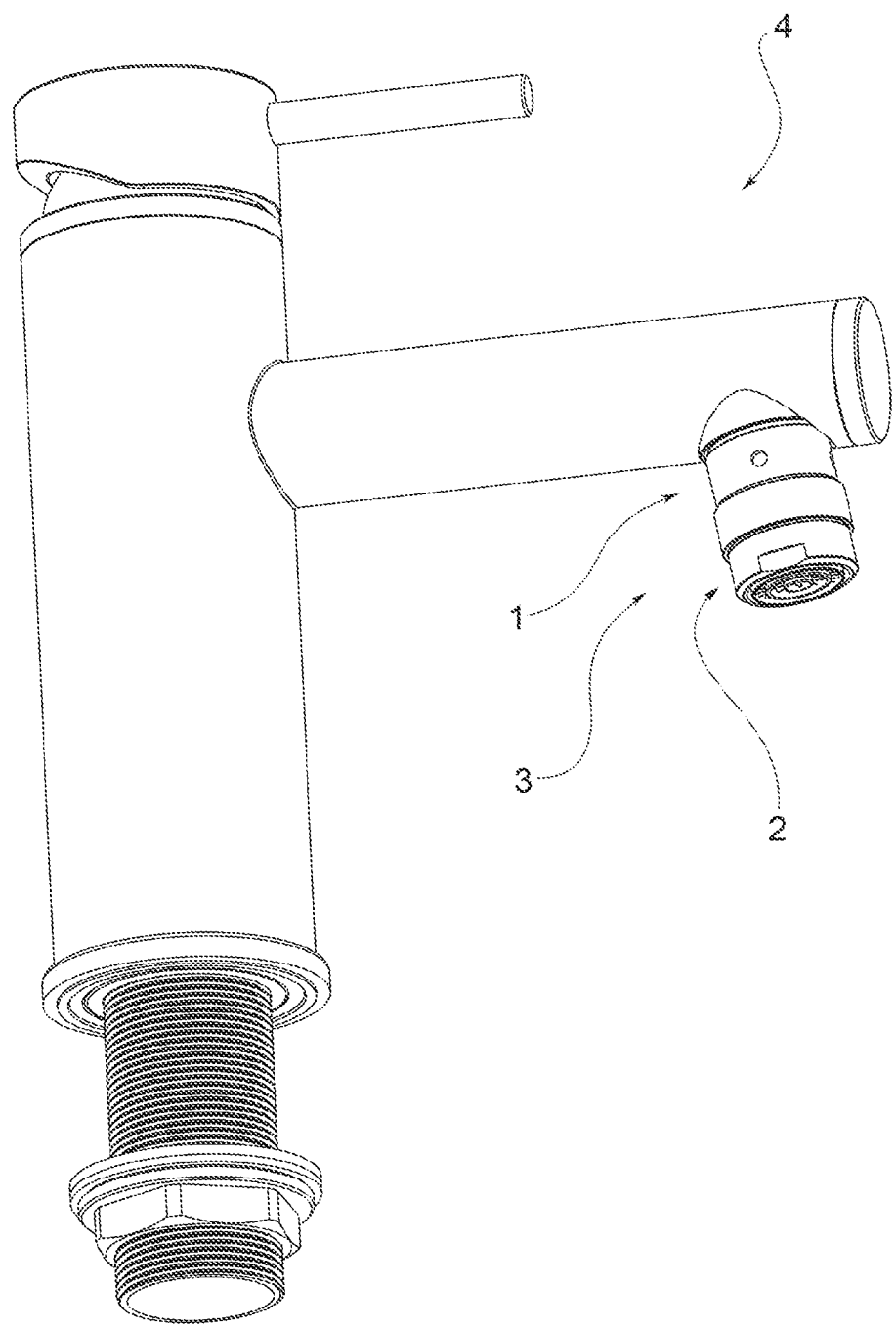
FIG. 6 shows a tap provided with the dispensing device according to the invention.

In this embodiment, the safety valve 1 is combined with an aerator 2 so as to form a single dispensing device 3 of a water flow. As shown in FIG. 6, such a dispensing device 3 of a water flow is suitable to be connected to the outlet mouth of a tap 4.

For those skilled in the art, it is in any case apparent from the following description that the safety valve 1 can also be used in other circumstances, where an increase in the pressure of the fluid downstream of the safety valve 1 can occur.

In a general embodiment, the safety valve 1 comprises a valve body 8 which forms an inlet opening 10 of the fluid, an outlet opening 12 of the fluid, a main passageway 14 for the fluid which fluidly connects the inlet opening 10 to the outlet opening 12.

The valve body 8 also forms at least one fluid relief opening 16 which fluidly communicates with the outlet opening 12 through a valve seat 18.

The safety valve 1 comprises a shutter 20 elastically cooperating with the valve seat 18 so as to be normally biased by an elastic device 22 to sealingly close the valve seat 18 and open the valve seat 18 when the pressure of the fluid in the outlet opening 12 exceeds the force applied by the elastic device 22.

The pressure of the fluid in the outlet opening 12 increases when the outlet opening 12 is in some way throttled or even completely closed, for example by a partially or completely obstructed aerator 2.

Therefore, in the normal operation of the safety valve, i.e. when this increase in pressure does not occur beyond a preset threshold value, determined by the force of the elastic device 22, shutter 20 closes the valve seat 18 and therefore the inlet fluid leaves the safety valve 1 through the outlet opening 12.

In the event of overpressure in the outlet opening 12, shutter 20 opens the valve seat 18 so as to allow the pressurized fluid to be discharged towards the outside through the relief opening 16. The pressure of the fluid is then immediately brought below the preset threshold value, avoiding risks of compromising the integrity of the fluid dispensing system.

In an embodiment, a shutter chamber 24 open towards the outlet opening 12 and communicating with the at least one relief opening 16 is obtained in the valve body 8. A shutter insert 26 comprising shutter 20 and an annular portion 28 sealingly coupled with the shutter chamber 24 and defining the valve seat 18 cooperating with shutter 20, is accommodated in this shutter chamber 24.

For example, the shutter chamber 24 is substantially cylindrical in shape, with a chamber opening 24' directly facing the outlet opening 12 of the safety valve 1. The annular portion 28 can be toroidal in shape with a "C" cross section open outwards so as to accommodate a sealing element 28', e.g. an O-ring, which cooperates with the wall of the shutter chamber 24 that delimits the chamber opening 24'.

In an embodiment, the shutter insert 26 is inserted into the shutter chamber 24 with a shape and/or force coupling. The force coupling can be obtained by the interference between the sealing element 28' and the wall of the shutter chamber 24.

Moreover, in an embodiment, the shutter chamber 24 is closed at the end opposite to the chamber opening 24' and forms an abutment 30 for the shutter insert 26.

In an embodiment shown in the drawings, the valve body 8 is formed by an outer tubular portion 80 and by a cartridge portion 100 sealingly accommodated in the outer tubular portion 80.

The outer tubular portion 80 extends between a first open end 82, which forms the inlet opening 10, a second open end 84, which forms the outlet opening 12. The outer tubular portion 80 has a side wall 86 in which the at least one relief opening 16 is obtained.

In an embodiment shown, the outer tubular portion 80 extends about a body axis X. For example, the outer tubular portion 80 is substantially cylindrical in shape.

The first end 82 can have an outer thread 82, for example for a screwing, with the interposition of an annular sealing gasket 90, to the outlet mouth of the spout of a tap 4; the second end 84 can have an inner thread 84, for example for screwing the aerator 2.

In an embodiment, several relief openings 16 are obtained in the side wall 86 equally distributed about the body axis X.

The shutter chamber 24 and the main passageway 14 are obtained in the cartridge portion 100.

In an embodiment, the cartridge portion 100 comprises a central portion 102 in which there is obtained the shutter chamber 24 and a peripheral portion 104 sealingly coupled with the inner surface of the side wall 86 of the outer tubular portion 80.

Figure 3:
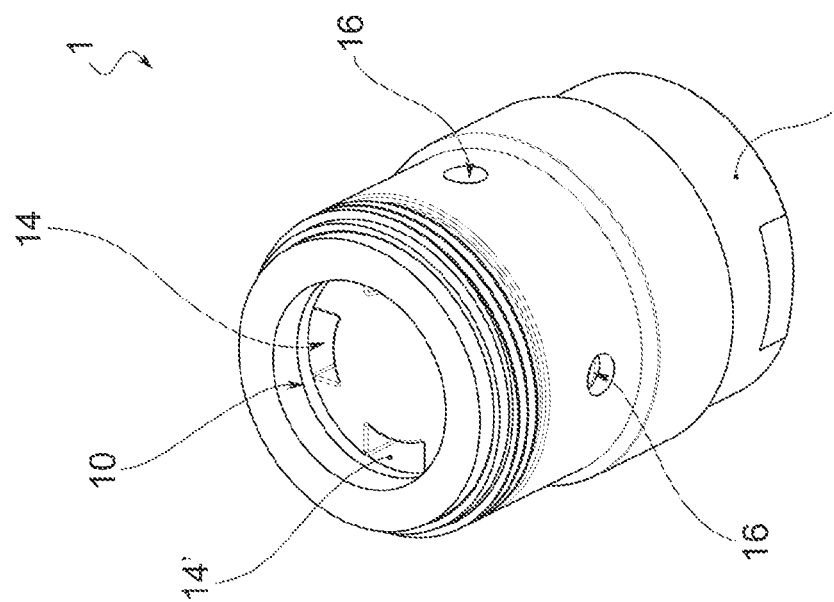
FIG. 3 is a top perspective view of the assembled dispensing device.
Figure 1:
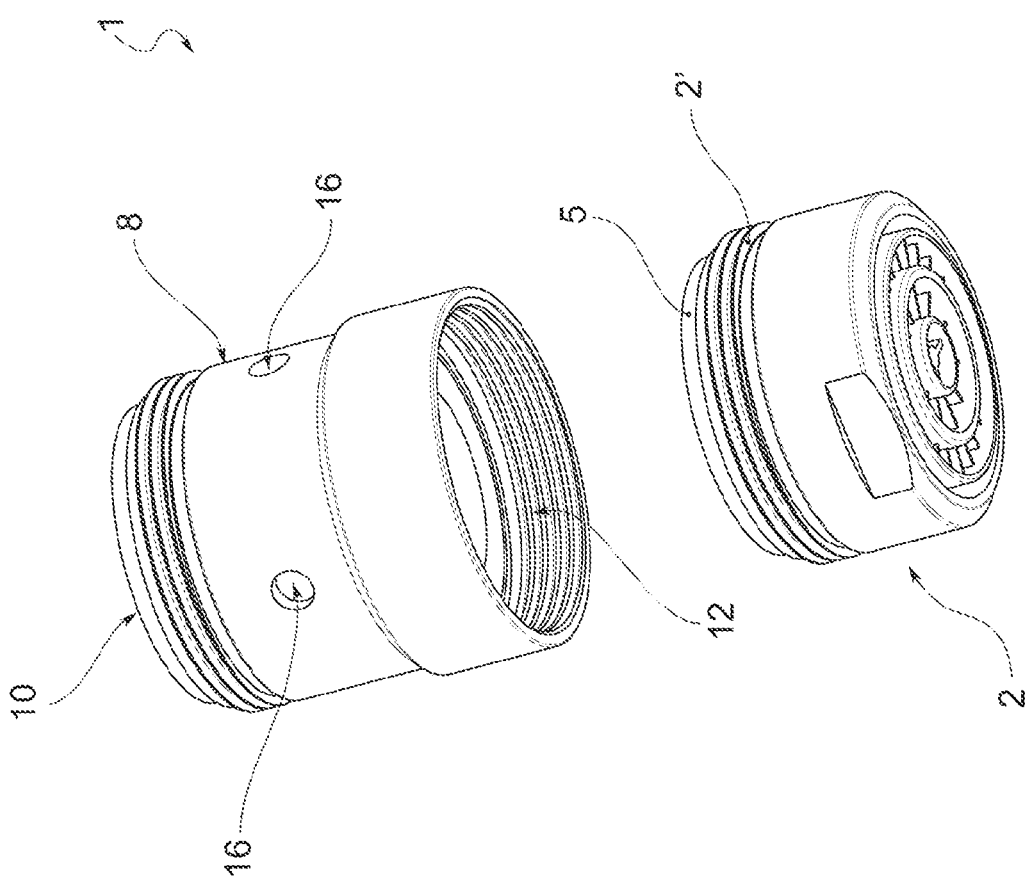
FIG. 1 is a perspective view of a dispensing device according to the invention, comprising a safety valve and an aerator, before the assembly thereof.
Figure 2:
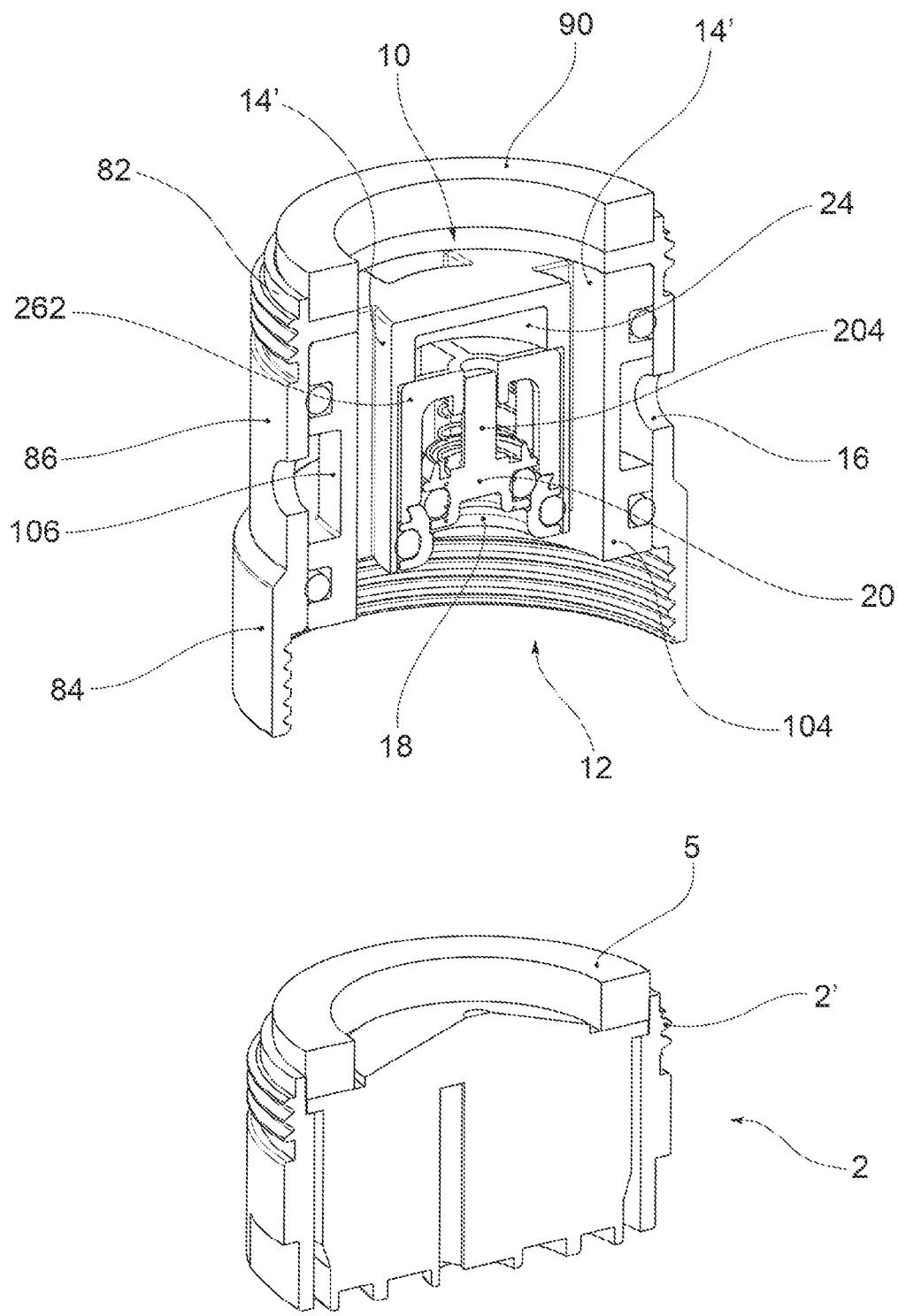
FIG. 2 shows an axial sectional view of the safety valve and the aerator, before the assembly thereof.
Figure 4:
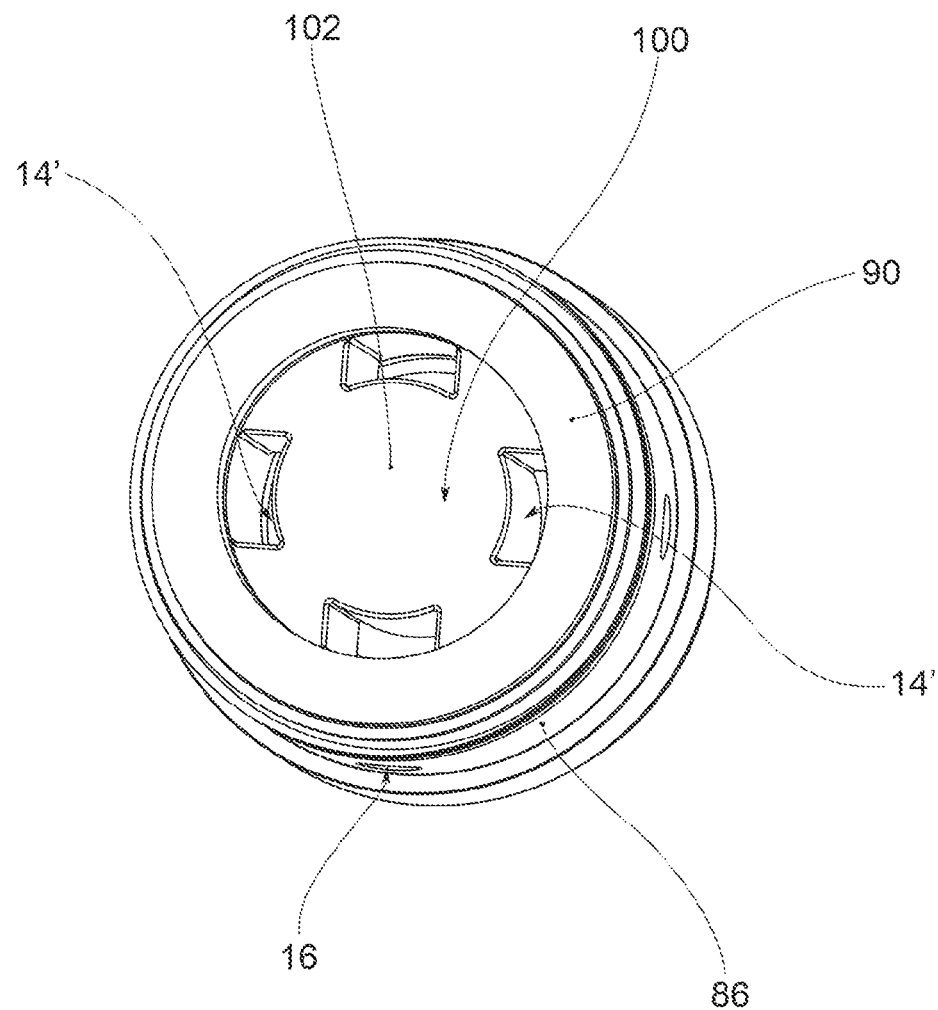
FIG. 4 is a top plan view of the dispensing device.

As seen in particular in FIG. 4, in an embodiment, the main passageway 14 is formed by a plurality of channels 14' which cross the peripheral portion 104, for example obtained in uniformly distributed manner about the body axis X. Such channels therefore 14' surround the central portion 100.

Radial slits 106 which put the valve seat 18 in communication with respective relief openings 16 are obtained in an axially intermediate portion of the peripheral portion 104.

In other words, each radial slit 16 communicates with the shutter chamber 24.

Figure 5:
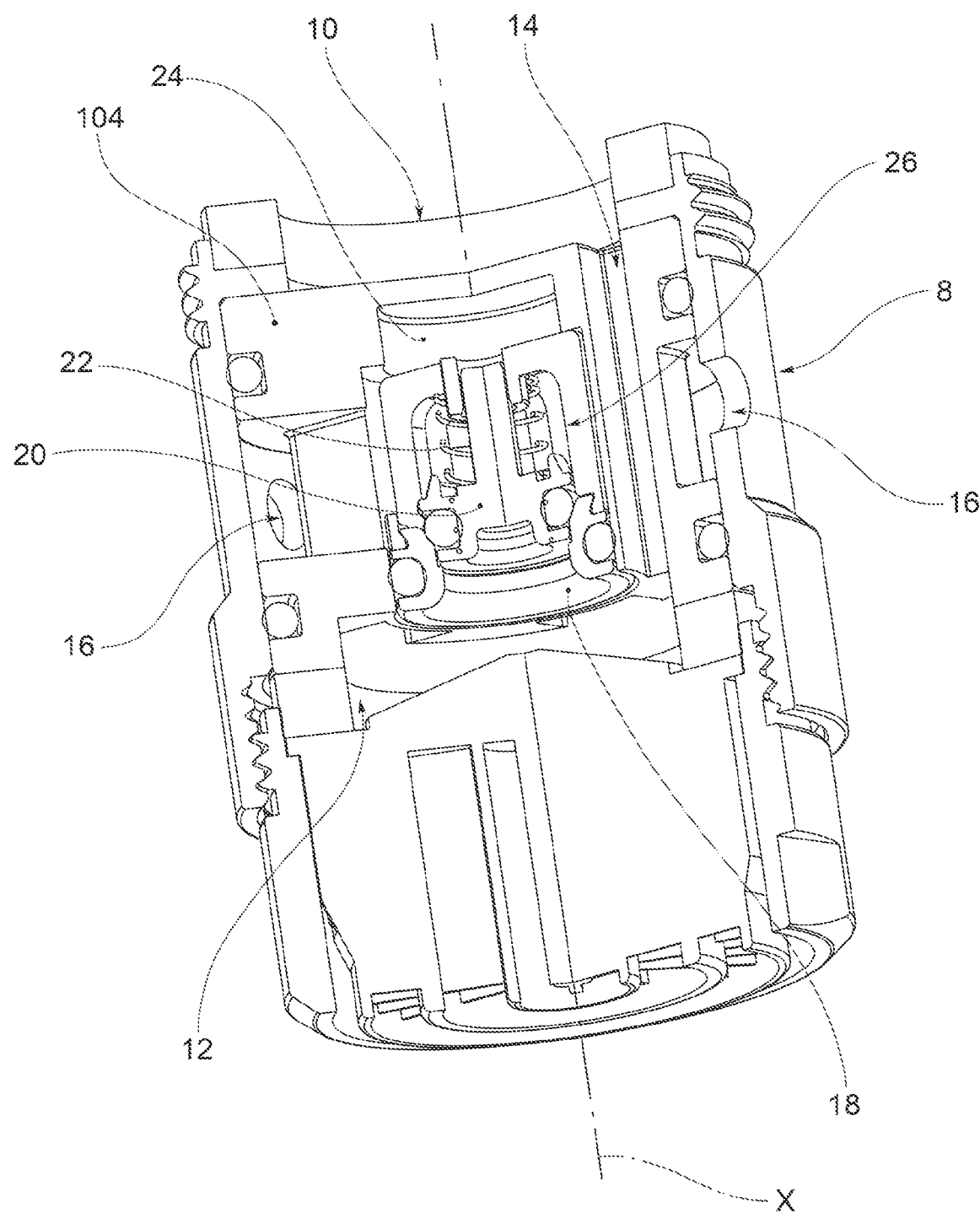
FIGS. 5 and 5a are two axial sectional views of the dispensing device with the safety valve in closed position and in open position, respectively.
Figure 5A:
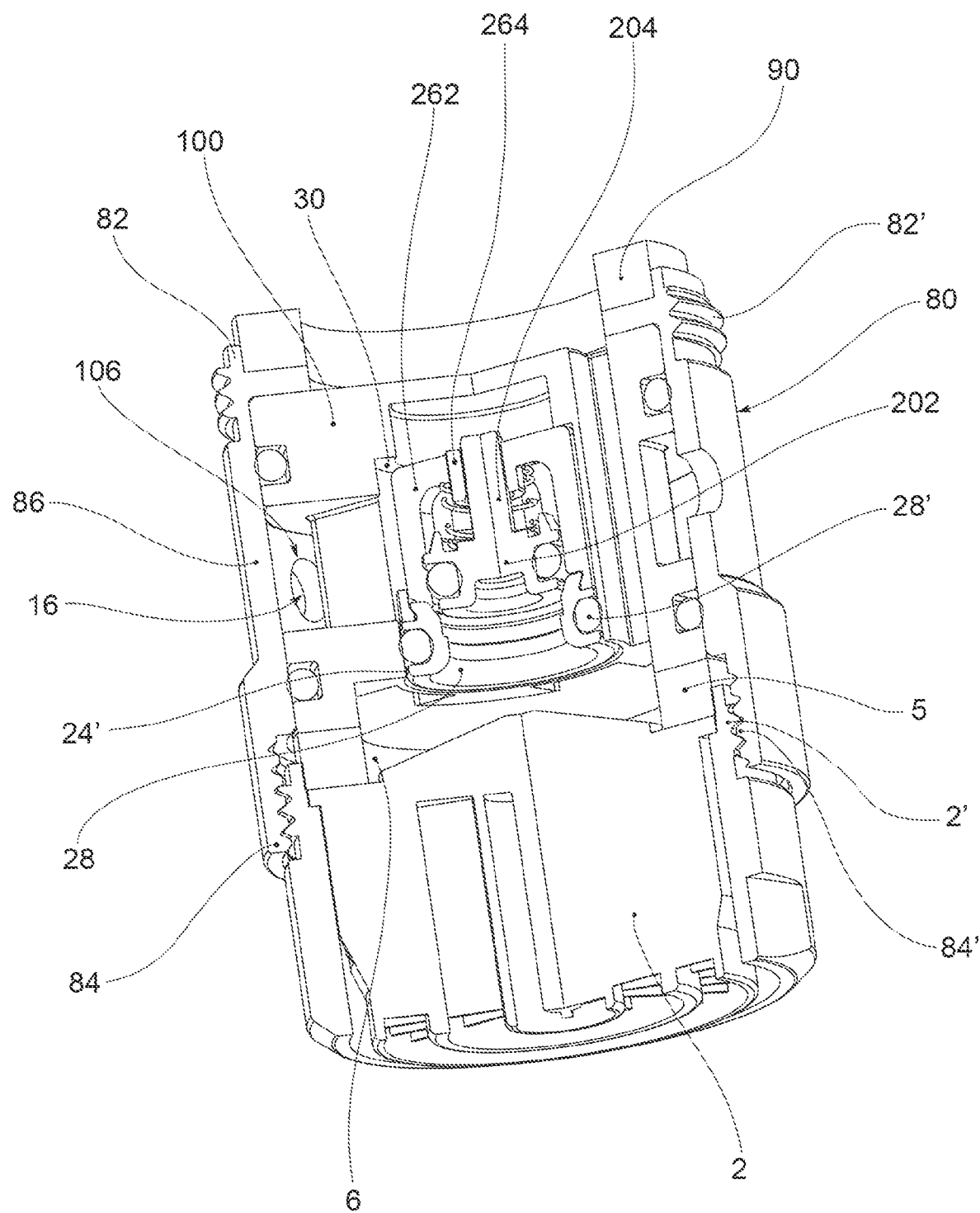

Returning now to the shutter insert 26, in an embodiment, shutter 20 is axially translatable in the shutter chamber 24 between an advanced closed position of the valve seat 18 (FIG. 5) and a retracted open position of the valve seat 18 (FIG. 5a).

More in detail, shutter 20 comprises a shutter portion 202 suitable to sealingly engage the valve seat 18 when shutter 20 is in advanced position, and a guide stem 204 which extends from the shutter portion 202.

In an embodiment, the shutter insert 26 comprises a frame 262, for example made in one piece with the annular element 28, which forms a guide portion 264 which slidingly supports the guide stem 204.

In an embodiment, the elastic device 22 are a helical spring which acts on shutter 20 by compression. The helical spring can, for example extend about the guide stem 204 and have an end which acts on the shutter portion 202 and the other end abutting against the frame 262.

As mentioned above, the object of the invention is a dispensing device 3 for a liquid, in particular water, that uses the above-described safety valve 1 and an aerator 2 of the known type, connected to the outlet opening 12 of the safety valve 1.

Aerator 2 can conventionally be provided with an externally threaded attachment portion 2' which is screwed to the second end 84 of the outer tubular portion 80.

In an embodiment, an annular sealing element 5, which rests for example against the peripheral portion 104 of the cartridge portion 100, can be interposed between aerator 2 and the cartridge portion 100.

In an embodiment, the end of the cartridge portion 100 facing aerator 2 is spaced apart from the aerator itself so as to form a liquid outlet chamber 6 into which the channels 14' lead and towards which the valve seat 18 faces.

If the aerator 2 is occluded, the liquid collected in this outlet chamber 6 can reach a pressure level such as to induce the translation of shutter 20 into retracted open position of the valve seat 20 (FIG. 5a). Thereby, the outlet chamber 6 is put into fluid communication with the radial slits 106 and therefore, with the relief openings 16.

It should be noted that in other applications, the increase in pressure downstream of the outlet opening 12 can also be induced in voluntary manner by plugging the outlet opening 12, for example also manually, to force the fluid flow to pass through the relief openings 16 rather than through the outlet opening 12.

Those skilled in the art may make changes and adaptations to the embodiments of the safety valve and the dispensing device according to the invention or can replace elements with others which are functionally equivalent, without departing from the scope of protection of the following claims. All the features described above as belonging to a possible embodiment may be implemented irrespective of the other embodiments described.

What is claimed is:

1. A tap comprising an outlet mouth of fluid, a dispensing device of a fluid flow being connected to the outlet mouth, the tap comprising:
   a safety valve for controlling dispensing of the fluid flow from the outlet mouth, comprising:
      a valve body forming an inlet opening of the fluid, an outlet opening of the fluid, a main passageway for the fluid which fluidly connects the inlet opening to the outlet opening, at least one fluid relief opening which fluidly communicates with the outlet opening through a valve seat;
      a shutter elastically cooperating with the valve seat to be biased by an elastic device to sealingly close the valve seat, and to open said seat when pressure of the fluid in the outlet opening exceeds a force applied by said elastic device;

an aerator connected to the outlet opening of the safety valve.

2. The tap according to claim 1, wherein a shutter chamber which is open towards the outlet opening and communicating with the at least one relief opening is positioned in the valve body, a shutter insert comprising the shutter and an annular portion sealingly coupled to the shutter chamber and defining the valve seat for the shutter being housed in the shutter chamber.

3. The tap according to claim 1, wherein the valve body comprises:

an outer tubular portion having a first open end forming the inlet opening, a second open end forming the outlet opening, and a side wall in which the at least one relief opening is located;

a cartridge portion housed in the tubular portion, the shutter chamber and the main passageway being positioned in the cartridge portion.

4. The tap according to claim 2, wherein the shutter is movable in the shutter chamber between an advanced closed position of the valve seat and a retracted open position of the valve seat.

5. The tap according to claim 4, wherein the shutter comprises a shutter portion to sealingly engage the valve seat when the shutter is in the advanced closed position, and a guide stem which extends from said shutter portion.

6. The tap according to claim 5, wherein the shutter insert comprises a guide portion which slidingly supports the guide stem.

7. The tap according to claim 1, wherein the elastic device is a helical spring which acts on the shutter by compression.

8. The tap according to claim 3, wherein the cartridge portion comprises a central portion in which the shutter chamber is positioned and a peripheral portion sealingly coupled to the side wall of the outer tubular portion, the main passageway being formed by a plurality of channels which cross said peripheral portion, radial slits which provide communication between the valve seat and respective relief openings being positioned in an axially intermediate portion of the peripheral portion.

* * * * *